US009951721B2

(12) United States Patent
Kupratis et al.

(10) Patent No.: US 9,951,721 B2
(45) Date of Patent: Apr. 24, 2018

(54) THREE-STREAM GAS TURBINE ENGINE ARCHITECTURE

(71) Applicant: UNITED TECHNOLOGIES CORPORATION, Hartford, CT (US)

(72) Inventors: Daniel Bernard Kupratis, Wallingford, CT (US); Walter A Ledwith, Jr., Marlborough, CT (US); Christopher J Hanlon, Sturbridge, MA (US)

(73) Assignee: United Technologies Corporation, Farmington, CT (US)

( * ) Notice: Subject to any disclaimer, the term of this patent is extended or adjusted under 35 U.S.C. 154(b) by 711 days.

(21) Appl. No.: 14/519,272

(22) Filed: Oct. 21, 2014

(65) Prior Publication Data

US 2016/0312740 A1  Oct. 27, 2016

Related U.S. Application Data

(60) Provisional application No. 62/066,437, filed on Oct. 21, 2014.

(51) Int. Cl.
| | |
|---|---|
| *F02C 1/00* | (2006.01) |
| *F02K 3/075* | (2006.01) |
| *F02C 3/10* | (2006.01) |
| *F02K 3/077* | (2006.01) |

(52) U.S. Cl.
CPC .............. *F02K 3/075* (2013.01); *F02C 3/10* (2013.01); *F02K 3/077* (2013.01)

(58) Field of Classification Search
CPC .......... F02K 3/077; F02K 3/075; F02K 3/105; F02K 3/115; F02C 7/08; F02C 7/10
See application file for complete search history.

(56) References Cited

U.S. PATENT DOCUMENTS

| | | | |
|---|---|---|---|
| 3,938,328 A * | 2/1976 | Klees ................. | F02K 3/04 60/224 |
| 7,134,271 B2 | 11/2006 | Baughman et al. | |
| 7,162,859 B2 | 1/2007 | Franchet et al. | |
| 7,216,475 B2 | 5/2007 | Johnson | |
| 7,246,484 B2 | 7/2007 | Giffin, III et al. | |
| 7,395,657 B2 | 7/2008 | Johnson | |
| 7,464,536 B2 | 12/2008 | Renggli et al. | |
| 7,614,210 B2 | 11/2009 | Powell et al. | |
| 7,758,303 B1 | 7/2010 | Wadia et al. | |
| 7,774,171 B2 | 8/2010 | Chou et al. | |
| 7,845,902 B2 | 12/2010 | Merchant | |
| 2005/0109012 A1* | 5/2005 | Johnson ............. | F02K 3/065 60/226.1 |
| 2007/0186535 A1* | 8/2007 | Powell ............... | F02K 1/08 60/226.1 |

(Continued)

FOREIGN PATENT DOCUMENTS

EP  2553251 A1  2/2013
WO  2011162845 A1  12/2011

*Primary Examiner* — Gerald L Sung
(74) *Attorney, Agent, or Firm* — Bachman & LaPointe, P.C.

(57) ABSTRACT

A gas turbine engine includes an auxiliary airflow control system to provide selective communication of a portion of a second stream from a second stream flow path into a third stream flow path, the auxiliary airflow control system in communication with a high temperature flow sourced from the turbine section.

17 Claims, 2 Drawing Sheets

(56) References Cited

U.S. PATENT DOCUMENTS

| | | | |
|---|---|---|---|
| 2009/0211222 A1* | 8/2009 | Roberge | F02C 3/13 60/226.1 |
| 2009/0293449 A1* | 12/2009 | Venter | F02C 9/18 60/226.1 |
| 2013/0199156 A1 | 8/2013 | Ress, Jr. et al. | |
| 2015/0198116 A1* | 7/2015 | Lovett | F02K 1/1269 239/11 |

* cited by examiner

US 9,951,721 B2

THREE-STREAM GAS TURBINE ENGINE ARCHITECTURE

RELATED APPLICATION

The present disclosure claims the benefit of United States Patent Disclosure Ser. No. 62/066,437, filed Oct. 21, 2014, and entitled "2.5 Stream Gas Turbine Engine Architecture", the disclosures of which applications are incorporated by reference herein in their entireties as if set forth at length.

STATEMENT REGARDING FEDERALLY SPONSORED RESEARCH OR DEVELOPMENT

This disclosure was made with Government support under FA8650-09-D-2923-DO-0021 awarded by The United States Air Force. The Government has certain rights in this disclosure.

BACKGROUND

The present disclosure relates to variable cycle gas turbine engines, and more particularly to a three-stream engine architectures.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained therein to generate a second combustion.

Variable cycle gas turbine engines power aircraft over a range of operating conditions yet achieve countervailing objectives such as high specific thrust and low fuel consumption. The variable cycle gas turbine engine essentially alters a bypass ratio during flight to match requirements. This facilitates efficient performance over a broad range of altitudes and flight conditions to generate high thrust for high-energy maneuvers yet optimize fuel efficiency for cruise and loiter.

Variable cycle gas turbine engines are typically of a three-stream engine architecture in which a two-stage fan directly feeds all three streams, e.g., core stream, second stream, third stream. Typically, a part-span booster fan stage feeds the core stream and the second stream. Although effective, this architecture may challenge hot section design due to the limited area available to execute three streams in the same required package space of traditional two stream engines.

SUMMARY

A gas turbine engine according to one disclosed non-limiting embodiment of the present disclosure includes a second stream flow path at least partially adjacent to a core flow path. A third stream flow path is at least partially adjacent to the second stream flow path. An auxiliary airflow control system provides selective communication of a portion of a second stream from the second stream flow path into the third stream flow path, the auxiliary airflow control system in communication with a high temperature flow sourced from the turbine section.

A further embodiment of the present disclosure includes, wherein the third stream flow path is in communication with a fan section that communicates an airflow into the core flow path, the second stream flow path, and the third stream flow path.

A further embodiment of any of the foregoing embodiments of the present disclosure includes, wherein the turbine section includes a low pressure turbine section downstream of a high pressure turbine section.

A further embodiment of any of the foregoing embodiments of the present disclosure includes, wherein the auxiliary airflow control system includes a heat exchanger to heat a portion of a second stream from the second stream path upon entry into the third-stream flow path.

A further embodiment of any of the foregoing embodiments of the present disclosure includes, wherein the auxiliary airflow control system includes a control valve to direct a portion of a second stream from the second stream path into the third-stream flow path.

A further embodiment of any of the foregoing embodiments of the present disclosure includes, wherein the auxiliary airflow control system includes a heat exchanger downstream of the control valve.

A further embodiment of any of the foregoing embodiments of the present disclosure includes, wherein the auxiliary airflow control system includes a heat exchanger and a control valve.

A further embodiment of any of the foregoing embodiments of the present disclosure includes, wherein the auxiliary airflow control system includes a heat exchanger that selectively heats a portion of a second stream from the second stream flow path for communication into the third stream flow path via thermal transfer from a portion of the core stream through the turbine section, the portion of the core stream is the high temperature flow.

A further embodiment of any of the foregoing embodiments of the present disclosure includes, wherein the auxiliary airflow control system includes a heat exchanger that heats a portion of a second stream from the second stream flow path for communication into the third stream flow path via thermal transfer from a portion of the second stream in communication with the turbine section, the portion of the second stream is the high temperature flow.

A further embodiment of any of the foregoing embodiments of the present disclosure includes, wherein the auxiliary airflow control system includes a heat exchanger that heats a portion of a second stream from the second stream flow path for communication into the third stream flow path via thermal transfer from a portion of the core stream through a high pressure turbine of the turbine section, the portion of the core stream through the high pressure turbine is the high temperature flow.

A further embodiment of any of the foregoing embodiments of the present disclosure includes, wherein the auxiliary airflow control system includes a heat exchanger that heats a portion of a second stream from the second stream flow path for communication into the third stream flow path via thermal transfer from a portion of the second stream in communication with a high pressure turbine of the turbine section, the portion of the second stream through the high pressure turbine is the high temperature flow.

A further embodiment of any of the foregoing embodiments of the present disclosure includes, wherein the auxiliary airflow control system includes a heat exchanger that heats a portion of a second stream from the second stream flow path for communication into the third stream flow path via thermal transfer from a portion of the core stream through a low pressure turbine of the turbine section, the portion of the core stream through the low pressure turbine is the high temperature flow.

A further embodiment of any of the foregoing embodiments of the present disclosure includes, wherein the high temperature flow is communicated to a turbine exhaust case section downstream of the heat exchanger.

A further embodiment of any of the foregoing embodiments of the present disclosure includes, wherein the auxiliary airflow control system includes a heat exchanger that heats a portion of a second stream from the second stream flow path for communication into the third-stream flow path via thermal transfer with the high temperature flow from the turbine section, the high temperature flow exits downstream of the heat exchanger into a turbine exhaust section.

A further embodiment of any of the foregoing embodiments of the present disclosure includes, wherein the high temperature flow is returned to a lower pressure stage of the turbine section downstream of a heat exchanger that heats a portion of a second stream from the second stream flow path for communication into the third stream flow path.

A gas turbine engine according to another disclosed non-limiting embodiment of the present disclosure includes a fan section that communicates an airflow into a core flow path, a second stream flow path, and a third stream flow path; a turbine section in communication with the core flow path; and an auxiliary airflow control system including a heat exchanger in communication with a high temperature flow sourced from the turbine section.

A further embodiment of any of the foregoing embodiments of the present disclosure includes, wherein the third stream is at a lower pressure than the second stream.

A further embodiment of any of the foregoing embodiments of the present disclosure includes, wherein the high temperature flow is returned to a turbine exhaust case section.

A method of operating a gas turbine engine according to another disclosed non-limiting embodiment of the present disclosure includes providing for thermal transfer between a high temperature flow from a turbine section and a portion of a second stream from a second stream flow path that is communicated into a third-stream flow path such that the portion of the second stream that enters into the third stream flow path operates as a heat sink for the high temperature flow.

A further embodiment of any of the foregoing embodiments of the present disclosure includes, wherein the high temperature flow exits from, and returns to, a turbine section.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
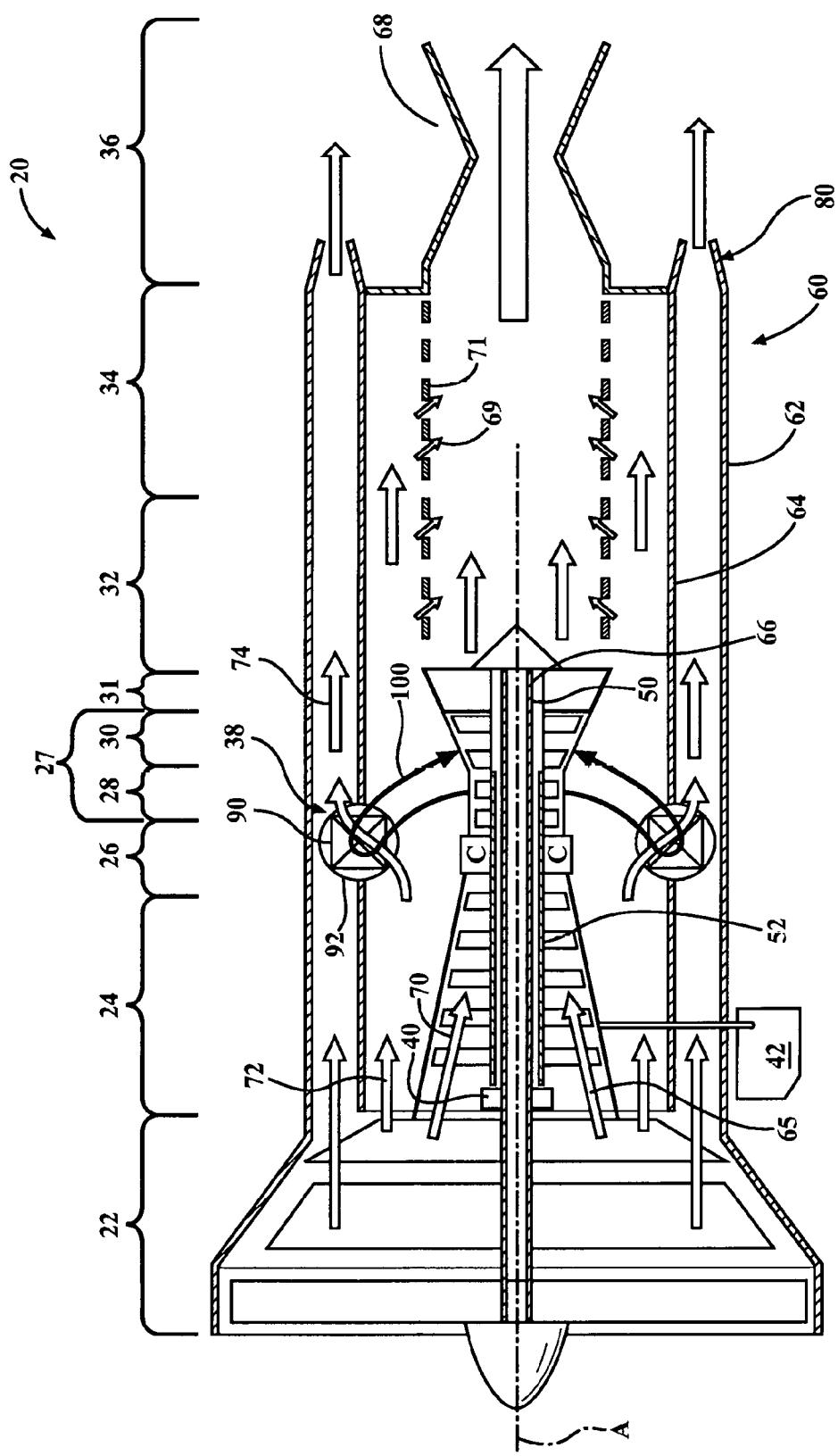
FIG. 1 is a schematic view of an example three-stream variable cycle gas turbine engine architecture with an auxiliary airflow control system according to one non-limiting embodiment.

FIG. 1 schematically illustrates a gas turbine engine 20. The gas turbine engine 20 is disclosed herein as a variable cycle two-spool turbofan that generally includes a fan section 22, such as a three stage fan; a compressor section 24; a combustor section 26; a turbine section 27 with a high pressure turbine section 28, and a low pressure turbine section 30; a turbine exhaust case section 31; an augmentor section 32; an exhaust duct section 34; a nozzle section 36; and an auxiliary airflow control system 38. The fan section, compressor sections, and turbine sections may include various architectures that, for example, include a multitude of stages, each with or without various combinations of variable or fixed guide vanes. The sections are defined along a central longitudinal engine axis A.

Additional systems such as a geared architecture 40, and an accessory gearbox 42, may be located within, or adjacent, various engine sections. For example, the geared architecture 40 may be located to drive the fan section 22 at a lower speed than the compressor section 24. An exemplary reduction transmission is an epicyclic transmission, namely a planetary or star gear system.

Variable cycle gas turbine engines power aircraft over a range of operating conditions and essentially alter a bypass ratio during flight to achieve countervailing objectives such as high specific thrust for high-energy maneuvers yet optimizes fuel efficiency for cruise and loiter operational modes. Although depicted as an augmented low bypass turbofan in the disclosed non-limiting embodiment, it should be appreciated that the concepts described herein are applicable to other gas turbine engines including non-augmented engines, geared architecture engines, direct drive turbofans, turbojet, turboshaft, multi-stream variable cycle, and other engine architectures with a nozzle system.

The engine 20 generally includes a low spool 50 and a high spool 52 that rotate about the engine central longitudinal axis A relative to an engine case structure 60 (illustrated schematically). Other architectures, such as three-spool architectures, will also benefit herefrom. The engine case structure 60 generally includes an outer case structure 62, an intermediate fan duct case structure 64, an intermediate case structure 65, and an inner case structure 66 that form a core stream path 70, a second stream flow path 72, and a third stream flow path 74 (all illustrated schematically by flow arrows). The intermediate case structure 65 is generally between the inner diameter of the fan section 22 and the compressor section 24 to facilitate direction of airflow from the fan section 22 as well as provide a ground the geared architecture 40. The engine case structure 60 may also include the turbine exhaust case section 31 that typically supports a portion of the weight of the low spool 50, in addition to bearing its own weight and the aerodynamic loads affecting thereon by the exhaust gases. It should be appreciated that various structures, individual, or collectively, may form the case structures 60 to essentially define an exoskeleton that supports the spools 50, 52 for rotation therein.

Air that enters the fan section 22 is divided between a core stream through the core stream path 70, a second stream through the second stream flow path 72, and a third stream through the third stream flow path 74. The core stream is compressed by the compressor section 24 mixed with fuel and burned in the combustor section 26, then expanded through the turbine sections 28, 30, at least partially deswirled by airfoils of the turbine exhaust case section 31, then exhausted through the exhaust duct section 34 and a mixed flow exhaust nozzle 68. The high pressure turbine section 28, and the low pressure turbine section 30 rotationally drive the respective high spool 52 and low spool 50 in response to the expansion. Fuel may also be selectively injected into the core stream in the augmentor section 32 downstream of the turbine sections 28, 30 to generate additional thrust through the mixed flow exhaust nozzle 68 downstream of the exhaust duct section 34.

The exhaust duct section 34 may be circular in cross-section as typical of an axis-symmetric augmented low bypass turbofan. Alternatively, or additionally, the exhaust duct section 34 may be non-axisymmetric in cross-section or other shape and/or non-linear with respect to the central longitudinal engine axis A to form, for example, a serpentine shape to block direct view to the turbine sections. The core stream path 70 terminates with the mixed flow exhaust nozzle 68 of the nozzle section 36 that may include, for example, various fixed, variable, convergent/divergent, two-dimensional and three-dimensional nozzle systems.

Airflow from the fan section 22 is also communicated as a second stream through the second stream flow path 72. In one example arrangement, the airflow from the fan section 22 is communicated from a last stage of the fan section 22 that is immediately upstream of the second stream flow path 72. The second stream may be utilized for a multiple of purposes to include, for example, heating and pressurization. The second stream, as defined herein, is any airflow different than the core stream. The second stream is generally communicated through an annulus defined by the intermediate fan duct case structure 64, then may be at least partially injected (illustrated schematically by flow arrows 69 through an augmentor liner 71) into the core stream path 70 adjacent the augmentor section 32 and the exhaust duct section 34 for exhaust through the mixed flow exhaust nozzle 68. That is, the core stream and the second stream are mixed for ejection through the mixed flow exhaust nozzle 68.

Airflow from the fan section 22 is also communicated as a third stream through the third stream flow path 74. The third stream flow path 74 is an annulus that may be defined by the outer case structure 62 and the intermediate fan duct case structure 64 in direct communication with the fan section 22. In this disclosed non-limiting embodiment, the third stream flow may be selectively throttled down to a minimal, but non-zero, airflow to backpressure the third stream airflow. Airflow from the second stream flow path 72 may also be selectively communicated into the third stream flow path 74 through the auxiliary airflow control system 38. The auxiliary airflow control system 38, in one disclosed non-limiting embodiment is located annularly around the second stream flow path 72 between the third stream airflow path 74 and the second stream flow path 72. That is, airflow from the second stream flow path 72 is selectively communicated into the third stream flow path 74 through the auxiliary airflow control system 38 in addition to the airflow from the fan section 22. The third stream flow path 74 may terminate with a third stream exhaust nozzle 80 that may include, for example, various fixed, variable, convergent/divergent, two-dimensional and three-dimensional nozzle systems.

In one disclosed non-limiting embodiment, the auxiliary airflow control system 38 generally includes a heat exchanger 90 and a valve 92. That is, the valve 92 operates to control flow between the second stream flow path 72 and the third stream flow path 74 through the heat exchanger 90. Although illustrated schematically, it should be appreciated that the auxiliary airflow control system 38 may be of an annular architecture and/or multiple discrete passages, ducts, or other selectively controlled flow path configurations distributed about the circumference of the second stream flow path 72 that selectively provides heated air from the second stream flow path 72 into the third stream flow path 74. It should also be appreciated that although particular systems are separately defined such as the heat exchanger 90 and the valve 92, each, or any of the systems, may be otherwise combined or segregated. For instance the heat exchanger 90 may itself be the valve 92.

The auxiliary airflow control system 38 may operate in response to a control module that may be, for example, a portion of a flight control computer, a portion of a Full Authority Digital Engine Control (FADEC), a stand-alone unit, or other system. The control module typically includes a processor, a memory, and an interface. The processor may be any type of microprocessor having desired performance characteristics. The memory may be any computer readable medium that stores data and control algorithms such as logic as described herein. The interface facilitates communication with other components such as an actuator that operates the valve 92.

The heat exchanger 90 utilizes the third stream as a heat sink such that the temperature of the third stream is increased within the third stream flow path 74. It should be appreciated that the heat exchanger 90 may be selectively operable and located in various sections of the engine 20. The heat exchanger 90, in this disclosed non-limiting embodiment, heats the third stream via thermal transfer with a high temperature flow 100 sourced from various stages in the high pressure turbine section 28 and/or the low pressure turbine section 30. That is, the heat from the high pressure turbine section 28 and/or the low pressure turbine section 30, is utilized to modify the thermal properties and pressures of the third stream within the third stream flow path 74, as well as selectively effect operation of the high pressure turbine section 28 and/or the low pressure turbine section 30. In one example, a temperature differential of about 100° F. (38° C.) may be provided through operation of the heat exchanger 90.

The high temperature flow 100 from the high pressure turbine section 28 and/or the low pressure turbine section 30, passes through the heat exchanger 90, is cooled through thermal exchange with the third stream, then is returned downstream into the high pressure turbine section 28 and/or the low pressure turbine section 30. That is, the high temperature flow 100 is communicated from a relatively higher pressure source to a relatively lower pressure source, e.g., from the high pressure turbine section 28 to the low pressure turbine section 30, from a higher pressure stage to a lower pressure stage within a single turbine section, etc.

The core stream through the high pressure turbine section 28 and/or the, the low pressure turbine section 30 and/or the secondary stream utilized for cooling of the high pressure turbine section 28 and/or the low pressure turbine section 30, may be utilized to modify the thermal properties and pressures of the third stream within the third-stream flow path 74 as well as the operation of the high pressure turbine section 28, and/or the low pressure turbine section 30. The withdrawal and return of air and/or gas from the turbine section selectively affects the flow parameter within the turbine section. That is, the heat exchanger 90 has a cold side sourced from the selected portion of the second stream that is communicated into the third stream via the auxiliary airflow control system 38.

It should be appreciated that the heat exchanger 90, and those that follow, may be selectively operable and located in various sections of the engine 20. For instance, the third-stream flow path 74 may be fed by bleed flow through the heat exchanger 90 downstream of the intermediate case structure 65 should the fan pressure ratio be warped radially from the root to tip such that the engine architecture has the fan pressure ratio higher at the root. That is, the bleed flow is extracted from an inner portion of the fan flow that passes through the intermediate case structure 65 as there is relatively more pressure in the bleed flow as a source for the heat exchanger 90 cold side.

Figure 2:
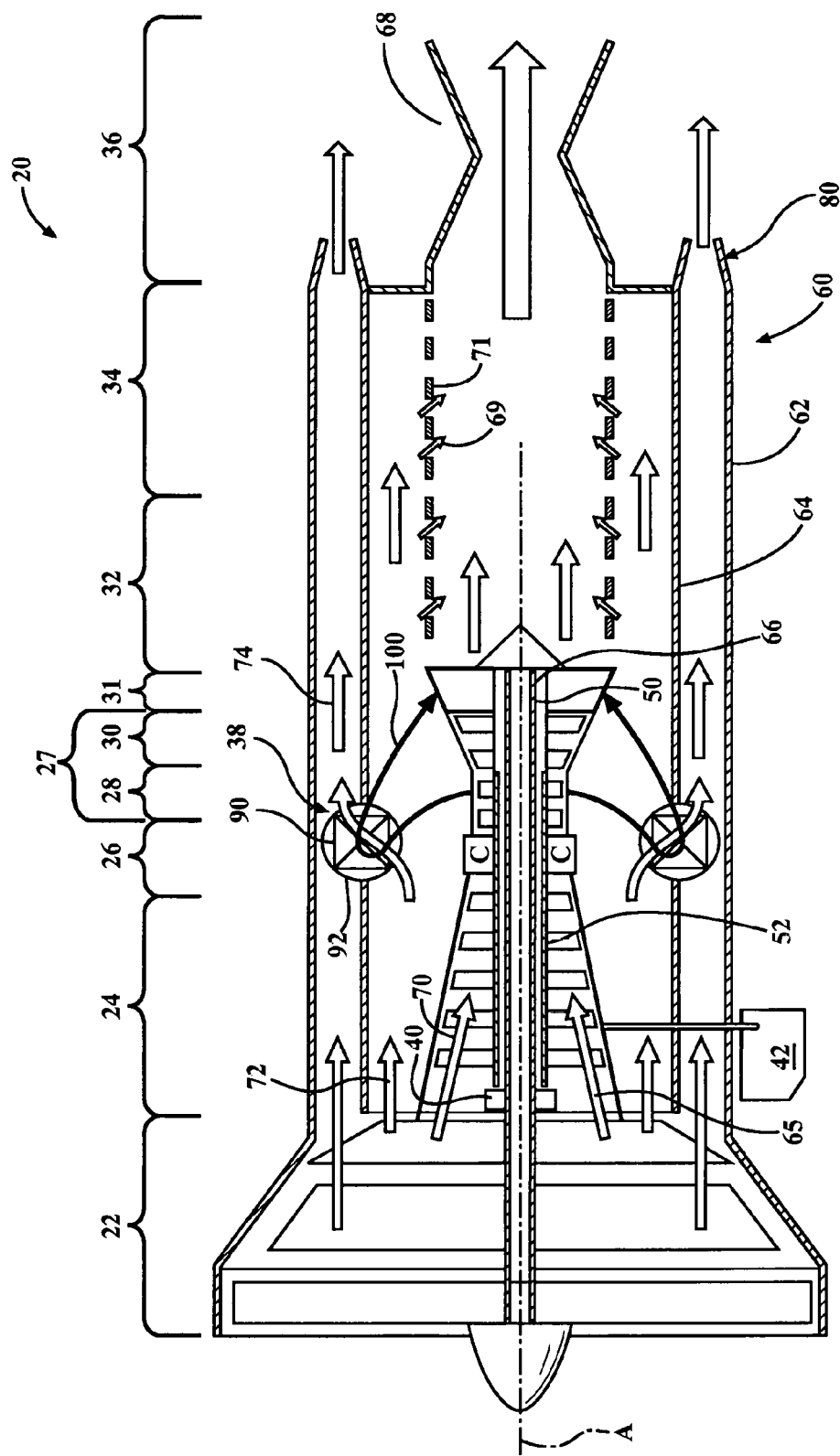
FIG. 2 is a schematic view of an example three-stream variable cycle gas turbine engine architecture with an auxiliary airflow control system that communicated with a turbine exhaust case section according to another non-limiting embodiment.

With reference to FIG. 2, another disclosed non-limiting embodiment of the engine 20B includes locates the auxiliary airflow control system 38 to exhaust the relatively cooler high temperature flow 100 downstream of the heat exchanger 90 into the turbine exhaust case section 31. Communication of the high temperature flow 100 into the turbine exhaust case section 31 downstream of the heat exchanger 90 ensures the source pressure is greater than the sink pressure but does not overly constrain the engine design selection of the pressure in the second stream flow path 72.

The withdrawal and return of the high temperature flow within the turbine section 27 advantageously affects flow parameters within the turbine section without necessitating variable geometry in the turbine section 27. The pressure drop of the heat exchanger 90 cold side is enhanced by discharging a portion of the second stream into the third stream, which is at a lower pressure. At high-supersonic speed, the third stream can reduce spill drag by directing excess air flow through the engine. The heat exchanger 90 is thus less dependent on minimizing the pressure drop of the hot side loop. In other words, the turbine section 27 may be relatively less complicated as, for example, the variable guide vanes within the turbine section may be reduced or eliminated. The return of the high temperature flow from within the turbine section 27 permits a relatively significant pressure drop across the heat exchangers and thus enables a compact heat exchanger architecture which facilitates packaging in heretofore unavailable locations.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a turbine section in communication with a core flow path;
   a second stream flow path at least partially adjacent to said core flow path;
   a third stream flow path at least partially adjacent to said second stream flow path; and
   an auxiliary airflow control system to provide selective communication of a portion of a second stream from said second stream flow path into said third stream flow path, said auxiliary airflow control system in communication with a high temperature flow sourced from said turbine section, wherein said auxiliary airflow control system includes a heat exchanger that selectively heats the portion of the second stream from said second stream flow path for communication into said third stream flow path via thermal transfer from a portion of a core stream through said turbine section, said portion of said core stream is the high temperature flow.

2. The gas turbine engine as recited in claim 1, wherein said third stream flow path is in communication with a fan section that communicates an airflow into said core flow path, said second stream flow path, and said third stream flow path.

3. The gas turbine engine as recited in claim 1, wherein said turbine section includes a low pressure turbine section downstream of a high pressure turbine section.

4. The gas turbine engine as recited in claim 1, wherein the heat exchanger heats the portion of said second stream from said second stream flow path upon entry into said third stream flow path.

5. The gas turbine engine as recited in claim 1, wherein said auxiliary airflow control system includes a control valve to direct the portion of said second stream flow from said second stream path into said third-stream flow path.

6. The gas turbine engine as recited in claim 5, wherein said auxiliary airflow control system includes said heat exchanger downstream of said control valve.

7. The gas turbine engine as recited in claim 1, wherein said auxiliary airflow control system includes said heat exchanger that heats said portion of said second stream from said second stream flow path for communication into said third stream flow path via thermal transfer from said portion of said second stream in communication with said turbine section.

8. The gas turbine engine as recited in claim 1, wherein said auxiliary airflow control system includes said heat exchanger that heats said portion of said second stream from said second stream flow path for communication into said third stream flow path via thermal transfer from said portion of said second stream in communication with a high pressure turbine of said turbine section.

9. The gas turbine engine as recited in claim 1, wherein the high temperature flow is communicated to a turbine exhaust case section downstream of said heat exchanger.

10. The gas turbine engine as recited in claim 1, wherein the high temperature flow is returned to a turbine exhaust case section.

11. A gas turbine engine comprising:
a turbine section in communication with a core flow path;
a second stream flow path at least partially adjacent to said core flow path;
a third stream flow path at least partially adjacent to said second stream flow path; and
an auxiliary airflow control system to provide selective communication of a portion of a second stream from said second stream flow path into said third stream flow path, said auxiliary airflow control system in communication with a high temperature flow sourced from said turbine section, wherein said auxiliary airflow control system includes a heat exchanger that heats said portion of said second stream from said second stream flow path for communication into said third stream flow path via thermal transfer from a portion of said core stream through a high pressure turbine of said turbine section, said portion of said core stream through said high pressure turbine is the high temperature flow.

12. A gas turbine engine comprising:
a turbine section in communication with a core flow path;
a second stream flow path at least partially adjacent to said core flow path;
a third stream flow path at least partially adjacent to said second stream flow path; and
an auxiliary airflow control system to provide selective communication of a portion of a second stream from said second stream flow path into said third stream flow path, said auxiliary airflow control system in communication with a high temperature flow sourced from said turbine section, wherein said auxiliary airflow control system includes a heat exchanger that heats said portion of said second stream from said second stream flow path for communication into said third stream flow path via thermal transfer from a portion of a core stream through a low pressure turbine of said turbine section, said portion of said core stream through said low pressure turbine is the high temperature flow.

13. A gas turbine engine comprising:
a turbine section in communication with a core flow path;
a second stream flow path at least partially adjacent to said core flow path;
a third stream flow path at least partially adjacent to said second stream flow path; and
an auxiliary airflow control system to provide selective communication of a portion of a second stream from said second stream flow path into said third stream flow path, said auxiliary airflow control system in communication with a high temperature flow sourced from said turbine section, wherein said auxiliary airflow control system includes a heat exchanger that heats said portion of said second stream from said second stream flow path for communication into said third-stream flow path via thermal transfer with the high temperature flow from the turbine section, the high temperature flow exits downstream of said heat exchanger into a turbine exhaust section.

14. The gas turbine engine as recited in claim 13, wherein a third stream in said third stream flow path is at a lower pressure than said second stream.

15. A gas turbine engine comprising:
a turbine section in communication with a core flow path;
a second stream flow path at least partially adjacent to said core flow path;
a third stream flow path at least partially adjacent to said second stream flow path; and
an auxiliary airflow control system to provide selective communication of a portion of a second stream from said second stream flow path into said third stream flow path, said auxiliary airflow control system in communication with a high temperature flow sourced from said turbine section, wherein the high temperature flow is returned to a low pressure stage of the turbine section downstream of a heat exchanger that heats said portion of said second stream from said second stream flow path for communication into said third stream flow path.

16. A method of operating a gas turbine engine, said gas turbine engine comprising: a turbine section in communication with a core flow path; a second stream flow path at least partially adjacent to said core flow path; a third stream flow path at least partially adjacent to said second stream flow path; and an auxiliary airflow control system to provide selective communication of a portion of a second stream from said second stream flow path into said third stream flow path, said auxiliary airflow control system in communication with a high temperature flow sourced from said turbine section, wherein said auxiliary airflow control system includes a heat exchanger that selectively heats said portion of said second stream from said second stream flow path for communication into said third stream flow path via thermal transfer from a portion of a core stream through said turbine section, said portion of said core stream is the high temperature flow, the method comprising: providing for thermal transfer between said high temperature flow from the turbine section and said portion of said second stream from said second stream flow path that i communicated into said third stream flow path such that the portion of the second stream that enters into the third stream flow path operates as a heat sink for the high temperature flow.

17. The method as recited in claim 16, wherein the high temperature flow exits from, and returns to the turbine section.

* * * * *